United States Patent [19]

Schieve et al.

[11] Patent Number: 5,530,847
[45] Date of Patent: Jun. 25, 1996

[54] SYSTEM AND METHOD FOR LOADING COMPRESSED EMBEDDED DIAGNOSTICS

[75] Inventors: Eric Schieve; Richard Finch, both of Austin, Tex.

[73] Assignee: Dell USA, L.P., Austin, Tex.

[21] Appl. No.: 91,548

[22] Filed: Jul. 14, 1993

Related U.S. Application Data

[63] Continuation-in-part of Ser. No. 34,056, Mar. 22, 1993.

[51] Int. Cl.$^6$ .................................................. G06F 9/45
[52] U.S. Cl. ................................. 395/183.14; 364/267.7
[58] Field of Search ............................... 395/575; 3/700; 371/18, 21.1; 364/265.5, 267, 267.5, 267.6, 267.7

[56] References Cited

U.S. PATENT DOCUMENTS 5,245,615  9/1993  Treu .................................. 371/16.5
5,307,497  4/1994  Feigenbaum et al. ................. 395/700

Primary Examiner—Vincent P. Canney
Attorney, Agent, or Firm—David Hitt; James Huffman

[57] ABSTRACT

Disclosed are a system and method for loading diagnostic routines for execution in a computer system. The method comprises the steps of (1) executing a boot loading routine stored in non-volatile memory within the computer system, the boot loading routine providing an environment in lieu of an operating system of the computer system within which to execute diagnostic routines, the boot loading routine including a decompression routine, (2) decompressing a compressed diagnostic routine stored in the non-volatile memory into video random access memory (RAM) and (3) executing the decompressed diagnostic routine under control of the boot loading routine. The present invention, in its preferred embodiment, allows relatively large diagnostic routines to be stored in electrically erasable programmable read only memory ("EEPROM") and decompressed, as required, into video RAM for execution, without requiring the computer's operating system to function.

36 Claims, 5 Drawing Sheets

SYSTEM AND METHOD FOR LOADING COMPRESSED EMBEDDED DIAGNOSTICS

CROSS REFERENCE TO RELATED APPLICATIONS

This application is a continuation-in-part of Ser. No. 08/034,056, filed on Mar. 22, 1993, entitled "USE OF RESET BUTTON TO ENTER EMBEDDED DIAGNOSTICS", incorporated herein by reference.

This application is also related to application Ser. No. (8/91,498), filed on Aug, 14, 1993, entitled "SYSTEM AND METHOD FOR LOADING DIAGNOSTIC ROUTINES FROM DISK" and incorporated herein by reference.

TECHNICAL FIELD OF THE INVENTION

The present invention is directed in general to computer diagnostics and, more specifically to diagnostics for personal computers capable of executing when faults prevent the personal computer from booting.

BACKGROUND OF THE INVENTION

Immeasurable gains in technology offered in personal computers "PCs") have allowed PCs to assume roles performed only by mainframe or minicomputers in the past. Many companies and individual users rely solely on commercially available PCs to meet their information processing needs. Thus, it is vital that their PCs perform reliably. If, however, a PC experiences a fault, it is equally vital that the PC communicate existence of the fault to inform the user of a need to repair the fault so the PC can return to active service.

For computer systems in general, it is most helpful for the computer system to provide an indication of the specific location and nature of the fault to help the user to more quickly isolate and more economically repair the fault. To that end, current PCs are typically equipped with some form of internal diagnostics, the purpose of which is detection and subsequent isolation of component faults within the PC architecture.

Diagnostic routines consist of a series of instructions executed by the central processing unit ("CPU") within the computer system to allow self diagnosis. For years, computers have been provided with diagnostic routines that test and report on the operational status or functionality of components within the computer, allowing an interested party to repair or replace components that are not functioning to the desired degree.

Diagnostic code is sometimes stored on disk and retrieved therefrom for execution by the CPU (so called disk based diagnostics). One advantage of disk based diagnostics is that disks provides a relatively large area in which to store code, allowing diagnostic routines to be relatively sophisticated and thorough in their testing and reporting. Unfortunately, diagnostic routines are frequently invoked when components in the computer are not completely functional. To successfully retrieve and execute disk based diagnostics, the following components must be fully functional: CPU, address and data buses, bus controller, disk drive controller and disk drive. If any significant information is to be relayed back to the user, a display device or a printer and their associated interface hardware must also be fully functional. It is apparent therefore that if any one of these components is not fully functional, the diagnostics may not execute or interact with the user properly.

One solution to the above noted problem with disk based diagnostics was provided in part by embedding diagnostic code in solid state, non volatile memory within the computer. Thus, read only memory ("ROM"), for instance, was employed to store diagnostic code as firmware. One type of embedded diagnostics is power on self test ("POST") diagnostics, generally stored in basic input output system ("BIOS") ROM in PCs. POST is a series of tests that the computer performs on its components each time the computer is turned on. POST begins by reading system configuration information that has either been hard wired or stored in non volatile memory. It then checks random access memory ("RAM") by writing to and reading from the RAM to ensure proper operation. POST next examines the disk drives to confirm that they match the system configuration information. Lastly, POST initiates the loading of the operating system, "booting" the computer. Failure during execution of POST isolates the fault area for proper diagnosis. Each phase of the POST routine involves a check of the computer systems major components: the memory, hard disk drive, diskette drive.

In contrast to disk based diagnostics, embedded (or ROM based) diagnostics require the following components to function: CPU, address and data buses, bus controller and keyboard. Again, if any significant information is to be relayed back to the user, a display device or printer and associated interface hardware must also be fully functional. Although ROM based diagnostics are typically required to fit within a smaller space and therefore do not have the luxury of being as thorough in testing as disk based diagnostics, it is apparent that fewer components need be functional to successfully retrieve and execute embedded diagnostics.

Because embedded diagnostic routines are forced to fit within the confines of non volatile memory, those routines must be more compact and thus generally less thorough in their testing than disk based diagnostic routines. To economize on space, embedded diagnostics usually take advantage of BIOS operating system hardware handling routines already stored in ROM, thus eliminating duplication.

Should the user be fortunate enough to have the system up and running at the time when a fault occurs, prior art disk based diagnostics provide an invaluable tool for analyzing computer system faults. However, should a fault render the computer system unable to initialize (or "boot"), there are currently no disk based diagnostic routines capable of executing within a non bootable system to diagnose the fault (a so called "non bootable fault"). This is because today's disk based diagnostic routines operate in conjunction with the computer system's operating system, making calls to its library of hardware handling routines. And, as previously described, today's disk based diagnostic routines require a large portion of the computer system to function, thus limiting their use when fundamental system faults occur.

Thus, disk-based diagnostics are completely inadequate and ineffective unless a large percentage of system components are fully functional, which is rarely the case during a system fault. Disk-based diagnostics are therefore not going to have much chance of detecting real world faults, as the vast majority of faults prevent the PC from booting and there are no means of targeting those faults.

There therefore exists a need in the art for relatively large and detailed non disk based diagnostic routines that provide a means for isolating and diagnosing non bootable component faults within a computer system, the diagnostic routines still able to fit within the confines of non volatile memory.

There further exists a need in the art for diagnostics which are independent of the computer's underlying operating system, permitting the diagnostics to perform system component initialization without use of BIOS hardware handling routines.

SUMMARY OF THE INVENTION

It is therefore a primary object of the present invention to provide thorough diagnostic routines that are embedded in non volatile memory, so they can reside permanently in the computer, eliminating a need to load the routines from an input/output ("I/O") device.

In the attainment of the above noted primary object, the present invention is the first to provide a method of loading diagnostic routines in a computer system comprising the steps of (1) executing a boot loading routine stored in non-volatile memory within the computer system, the boot loading routine including a decompression routine, (2) decompressing a driver routine and a compressed diagnostic routine stored in the non volatile memory into video RAM, the driver routine providing an environment in lieu of an operating system of the computer system within which to execute the diagnostic routine and (3) executing the driver routine under control of the boot loading routine.

Thus, the present invention takes advantage of compression algorithms to fit the diagnostic code into a space smaller than the code, if decompressed, would otherwise require. The code is stored in individually decompressible pages, comprising one or more routines or modules. Under initial control of the boot loading routine and subsequent control of the driver routine, diagnostic routines are decompressed and loaded into video RAM.

The present invention is designed to execute almost immediately following reboot of the PC as one of the earliest executable sections of system BIOS. This allows the present invention to function even when non-bootable faults prevent the PC from otherwise functioning.

If the compressed diagnostic routines are not correctly stored, the decompression routine will not be able to decompress the compressed diagnostic routines successfully. Accordingly, the boot loading routine verifies an integrity of information in the compressed diagnostic routine prior to performing the step of decompressing.

The boot loading routine also tests the integrity of the video subsystem prior to loading decompressed diagnostic routines into video RAM. The reason for this is obvious: if the video subsystem is not functioning, video RAM is not available to store the diagnostic routines and communication with the user via the video subsystem is hampered.

In a preferred embodiment, the present invention provides a visual interface to allow the user to select the diagnostic routines the user wants to run. A standard video display device or video monitor provides the visual interface. Prior to using the monitor, however, it is necessary to verify that the monitor is present. Accordingly, the boot loading routine determines a presence of a video monitor of the computer system prior to performing the step of decompressing.

In a preferred embodiment, the present invention allows for periodic changes in the diagnostic code. Thus, the non volatile memory is preferably electrically erasable programmable read only memory ("EEPROM," also termed "flash" memory). Although those skilled in the art should realize that non programmable ROM is suited to contain the boot loading routine and the compressed diagnostic routines, some form of reprogrammable ROM allows updating of the diagnostic code as improvements are made therein. Thus, programmable ROM ("PROM") and ultraviolet PROM ("UV PROM") are also within the scope of the present invention. Even RAM that has its own power source to allow it to retain its memory when the computer is powered down (such as complementary metal oxide semiconductor ("CMOS") RAM) is within the scope of the invention as a host for the diagnostic code.

As disclosed in Ser. No. 08/034,056, the diagnostic routines of the present invention are invoked via hardware, allowing the diagnostics to remain software-independent and minimally hardware dependent. Accordingly, in the preferred embodiment, the boot loading routine is invoked by pressing a reset button on the PC twice within a predetermined period of time.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
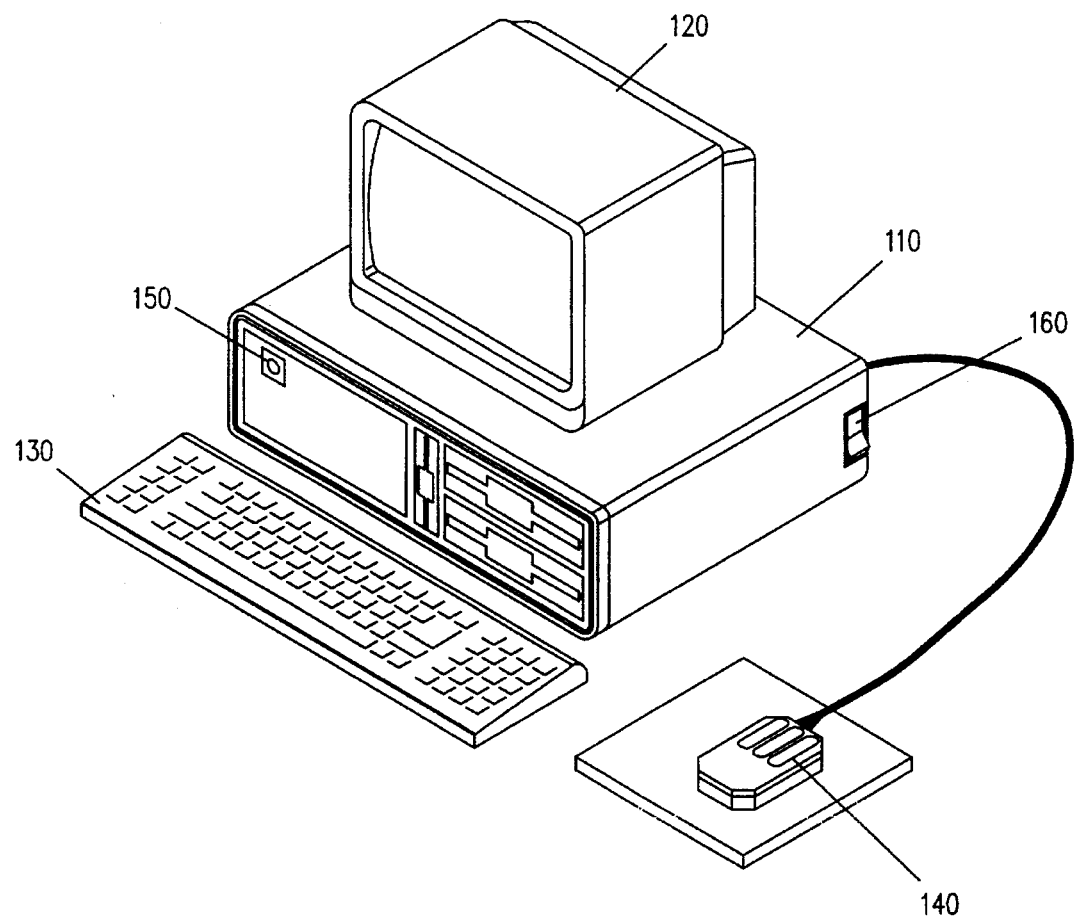
FIG. 1 illustrates an isometric view of a PC providing an environment within which the present invention operates.

FIG. 1 illustrates an isometric view of a PC providing an environment within which the present invention operates. The PC comprises a main chassis 110, a video display or monitor 120, a keyboard 130 and a pointing device or "mouse" 140 residing on a mouse pad (not referenced). Main chassis 110 contains the PC's microprocessor, its memory and video subsystems and all other computing circuitry, for that matter. These are not shown, because they are internal to main chassis 110. Main chassis 110 is also shown as having a reset switch 150 and an on/off power switch 160.

Reset switch 150 traditionally causes the PC to reboot, invoking conventional BIOS POST diagnostics and reinitializing the PC's operating system. However, as has been previously pointed out, reset switch 150 invokes the embedded diagnostic routines of the present invention. Those skilled in the art should realize that a dedicated diagnostics switch can perform the same function; the manner in which the diagnostics is entered is not pertinent to the present invention.

Figure 2:
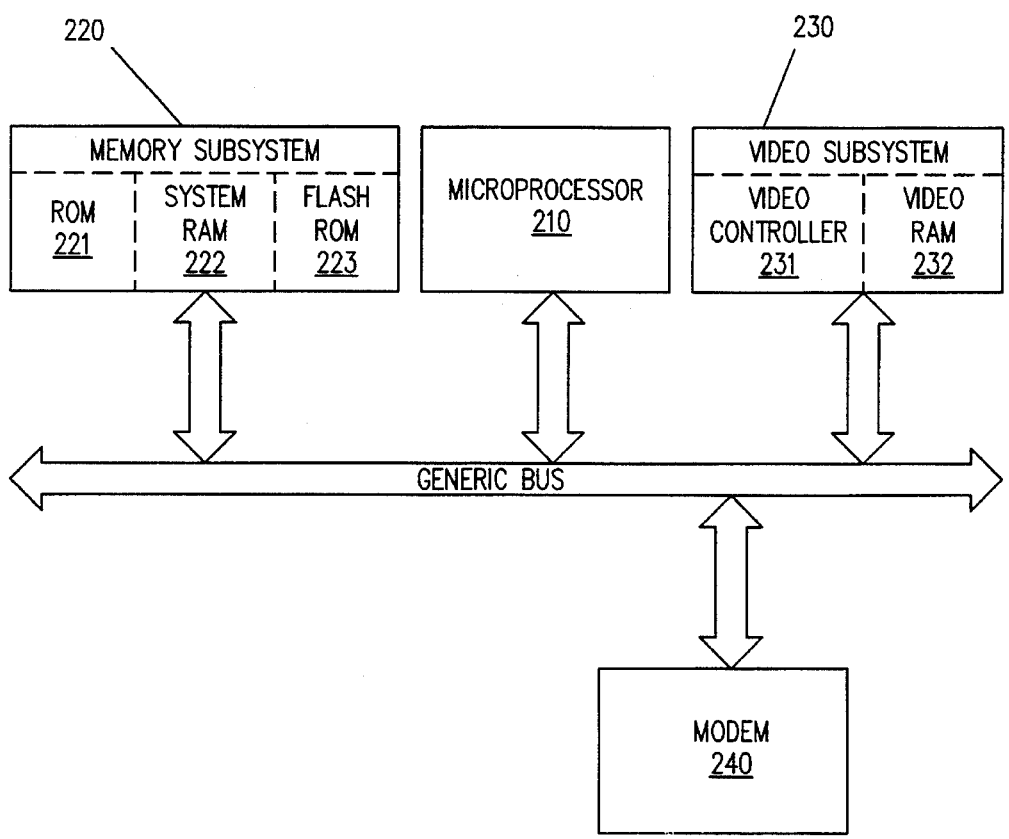
FIG. 2 illustrates a partial block diagram of a PC architecture.

Turning now to FIG. 2, illustrated is a partial block diagram of a PC architecture. The architecture comprises a microprocessor 210 coupled to a memory subsystem 220 and a video subsystem 230. Memory subsystem 220 comprises ROM 221, system RAM 222 and flash ROM 223, in which the boot loading routine and compressed diagnostic routines of the present invention are stored. Video subsystem 230 comprises a video controller 231 and video RAM 232. Actually, video RAM 232 can be thought of as being in either memory subsystem 220 or in video subsystem 230. No matter how it is thought of, video RAM 232 performs the same function. A modem 240 is coupled to microprocessor 210 and allows serial, asynchronous communication between microprocessor 210 and a remote terminal. This is detailed in connection with FIG. 5.

Figure 3:
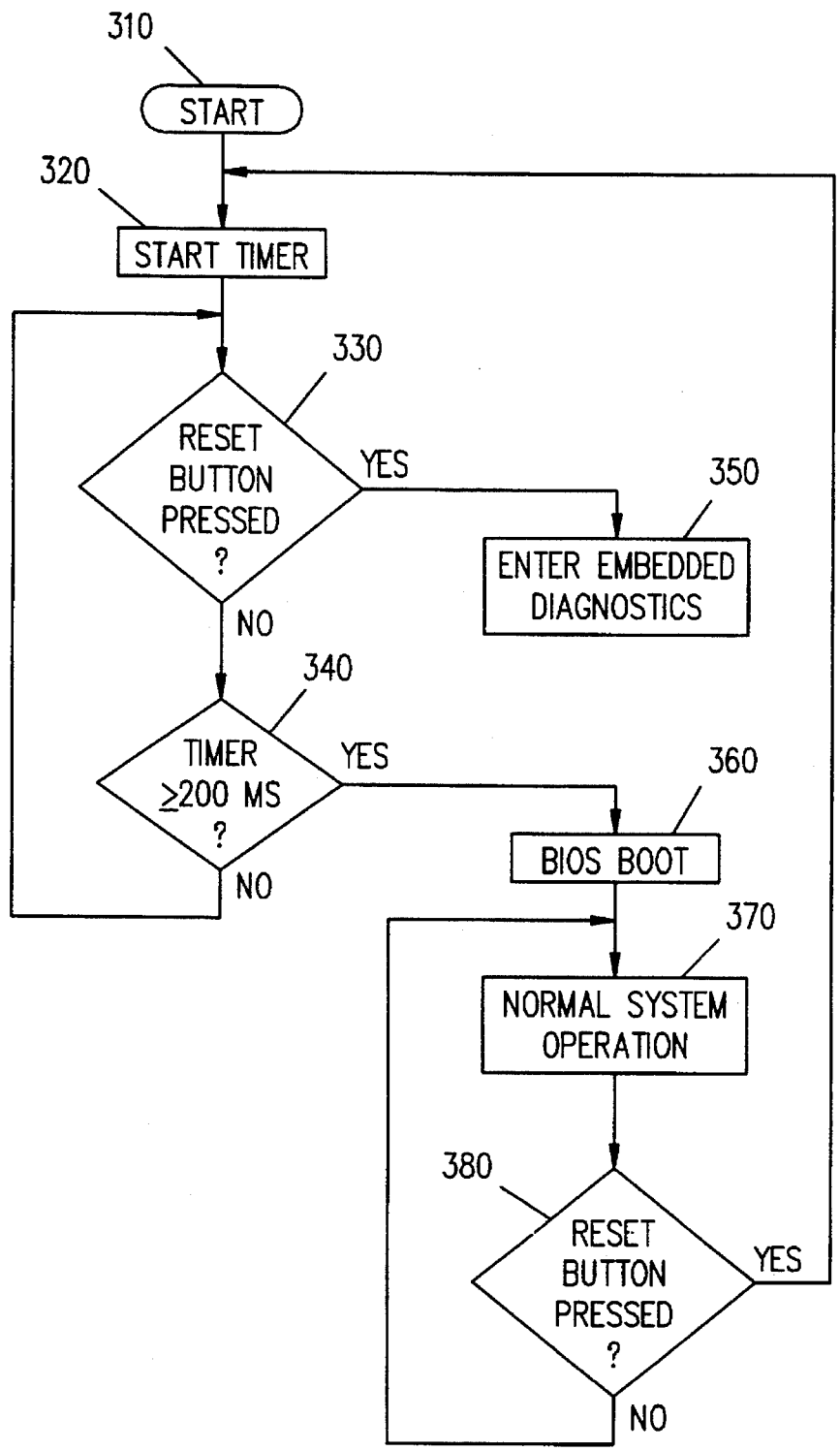
FIG. 3 illustrates a flow diagram of a procedure for entering the embedded diagnostic routines of the present invention.

Turning now to FIG. 3, illustrated is a flow diagram of a procedure for entering the embedded diagnostic routines of the present invention. Execution begins at "start" block 310 when the reset button 150 of FIG. 1 is pressed a first time. As soon as the button 150 is pressed, a timer is initialized to a value representing 200 milliseconds (block 320), within which the button 150 must again be pressed to enter embedded diagnostics. Next, execution proceeds to decisional block 330 wherein a second button press is detected. If not, the timer is decremented (decisional block 340) and execution returns to decisional block 330. If so, execution proceeds to block 350 and embedded diagnostics are invoked.

If the timer counts a full 200 ms, execution proceeds to "BIOS boot" block 360, wherein the computer initializes and begins normal operation (block 370). If reset button 150 is pressed during normal operation (decisional block 380), execution again proceeds to block 320, offering another opportunity to enter embedded diagnostics.

Figure 4:
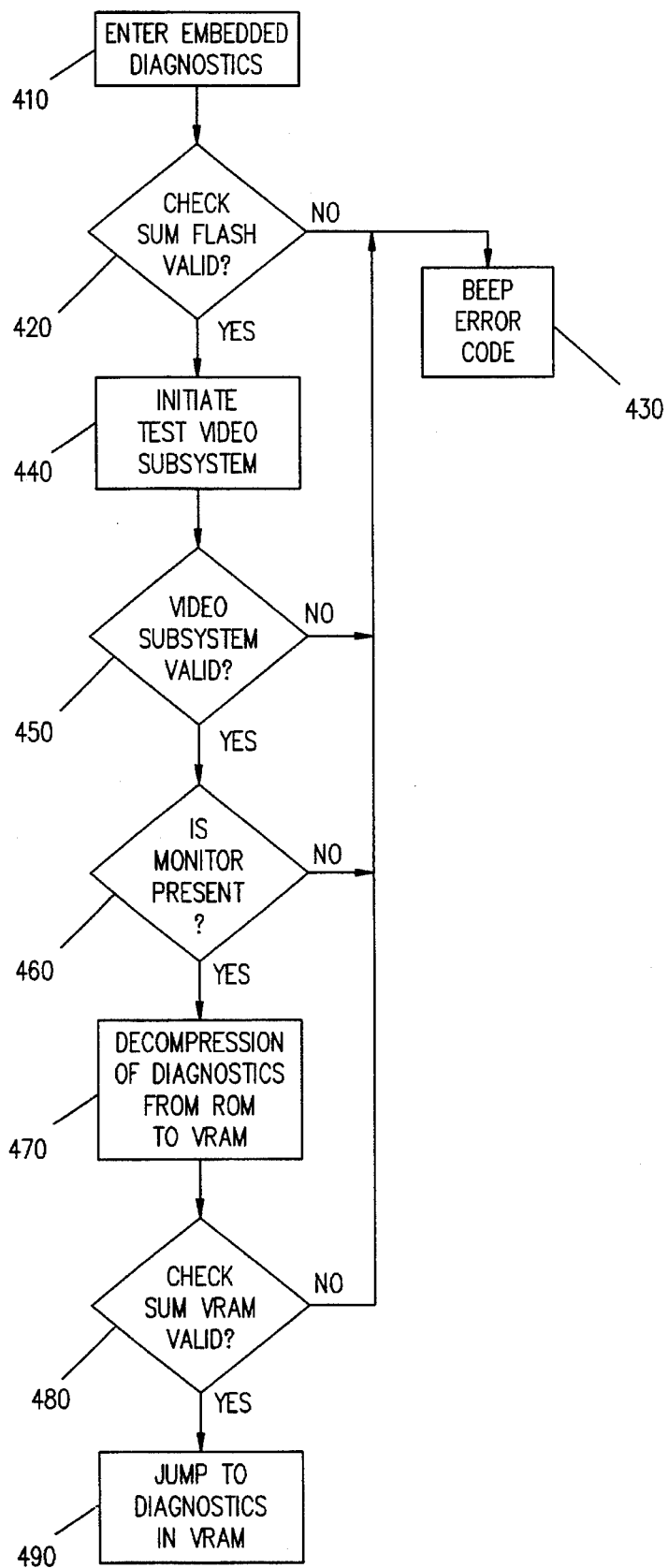
FIG. 4 illustrates a flow diagram of a procedure for executing the boot loader and loading individual diagnostic routines.

Turning now to FIG. 4, illustrated is a flow diagram of a procedure for executing the boot loading routine and the driver routine and loading diagnostic routines. Execution begins at block 410, having come from block 350 of FIG. 3 and is performed by the boot loading routine. Execution proceeds to decisional block 420, wherein the non volatile ("flash") memory that contains the boot loading routine and the compressed diagnostic routines is checksum tested to make sure that code integrity is maintained. If the flash memory fails the test, execution proceeds to block 430 and an audible "beep" is presented to the user, signalling a problem.

If, as is normal, the flash memory integrity is intact, execution proceeds to block 440, wherein the video subsystem is tested. This test verifies that the video RAM is present and functioning (decisional block 450) and that the monitor is present (decisional block 460). If not, the user hears a "beep" (block 430). If so, the boot loading routine decompresses a first diagnostic routine from flash ROM into video RAM (block 470), performs a checksum test on the decompressed diagnostic routine (decisional block 480) and jumps to the decompressed diagnostic routine (block 490) if it passes the checksum test performed in decisional block 480. If the checksum test is failed, the user hears a "beep" (block 430).

There are many conventional techniques for compressing and decompressing data, including those employing adaptive pattern substitution, variable-length character encoding (such as in Huffman or Morse coding) or restricted variability codes (such as 5/10 coding). The most appropriate method to employ depends upon the nature of the data being compressed. The method of compression employed is irrelevant to the present invention, as the object is simply to compress the data to fit it within the confines of flash RAM. However, those ordinarily skilled in the art should recognize that the decompression routine must be tailored to the technique employed to originally compress the data.

Because the routines are compressed and because execution of the routines is optional (not performed as a part of the normal boot of the PC), they can be made more thorough than standard BIOS POST. BIOS POST tests, in general, the processor and the memory subsystem. The diagnostic routines of the present invention test the components that are required to boot the PC.

An important aspect of the present invention is that it employs video RAM to hold the decompressed diagnostic routines. Although the diagnostic routines could be stored in system RAM, video RAM is used because system RAM is often the subject of the diagnostic routines. It is disadvantageous to store diagnostic routines in the same space that is being tested. Furthermore, system RAM is generally socketed, meaning that it may not always be present.

In a preferred environment, the video RAM and the associated video controller are integrated into the PC architecture, rather than being a part of a video controller. The only way to initialize a video controller is to know in very great detail what type of controller it is, because there are no standards governing the operation of video controllers. There are only two ways to initialize a video controller. One is to manually initialize all control registers within the controller and the other is to actually make calls to BIOS routines that access the video controller.

Since, as mentioned before, it is desirable to avoid calls to BIOS hardware handling routines, manual initialization of video controller registers is the only acceptable way to maintain software independence. And, since there are no standards governing video controllers, video RAM and the controller must be integrated into the system to ensure that the boot loading routine knows what controller is present, eliminating a possibility of another type of controller being present.

The current implementation of diagnostics loaded by means of the present invention is completely non-interactive, requiring and accepting no user intervention. These diagnostics present a predefined list of tests that are run in a cycle. If the test list is completed and no faults are found, the tests are run again from the top. The tests in the list are designed to proceed through the system in a logical fashion, starting at the microprocessor and going outward, through timers, the programmable interrupt control, real time clock, the cache subsystem, the memory subsystem, disk controllers and drives and so on, until the entire architecture has been tested. This ensures that no test is performed that itself depends upon the proper functioning of hardware that has not been tested.

Figure 5:
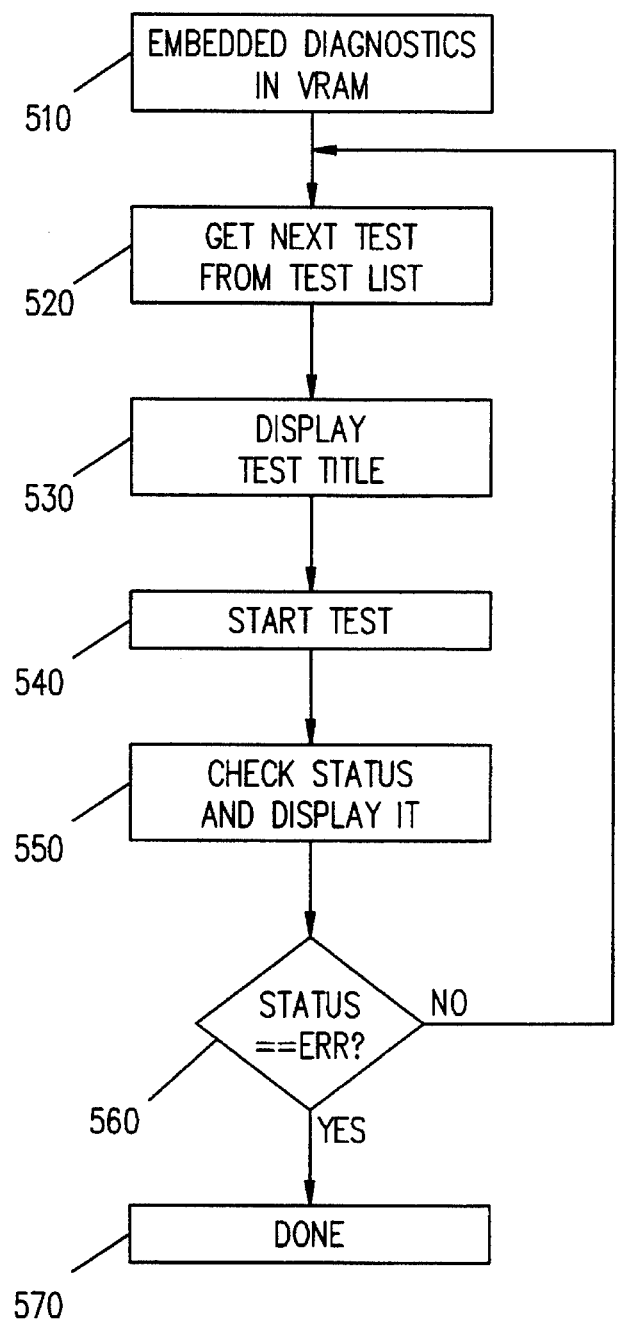
FIG. 5 illustrates a flow diagram of a procedure for executing individual diagnostic routines loaded in accordance with FIG. 3.

Turning now to FIG. 5, illustrated is a flow diagram of a procedure for executing individual diagnostic routines loaded in accordance with FIG. 4. Thus, execution begins in block 510 when the selected, decompressed diagnostic routine has been loaded into video RAM and checksum tested (block 490 of FIG. 4). Execution proceeds to block 520, wherein a series of tests is performed. A "next test," in this case a first test, is obtained from a test list. The title of the test is displayed to the user (block 530) on the monitor 120 of FIG. 1, the test is started (block 540) and the results of the test obtained (block 550). It is next decided whether the test was performed successfully (decisional block 560). If the test indicates a failure, execution proceeds to block 570 (done). If not, the test is passed and another test is performed (by looping back to block 520).

Although the present invention is disclosed as being employed on a personal computer, the present invention is designed to operate on any type of computer system, whether the computer system is a mainframe, a minicomputer or a PC. However, in the preferred embodiment of the present invention, the computer system is a PC. Users of PCs are far more likely to need computer diagnostics, because more likely than not, they are not as computer literate as those who deal with larger systems. PCs are not typically used in environments wherein technical personnel are continually on hand to diagnose faults.

From the above disclosure, it is apparent that the present invention provides a method of loading diagnostic routines in a computer system comprising the steps of (1) executing a boot loading routine stored in non-volatile memory within the computer system, the boot loading routine including a decompression routine, (2) decompressing a driver routine and a compressed diagnostic routine stored in the non-volatile memory into video RAM, the driver routine providing an environment in lieu of an operating system of the computer system within which to execute the diagnostic routine and (3) executing the driver routine under control of the boot loading routine.

Although the present invention and its advantages have been described in detail, it should be understood that various changes, substitutions and alterations can be made herein without departing from the spirit and scope of the invention as defined by the appended claims.

What is claimed is:

1. A method of loading diagnostic routines in a computer system, comprising the steps of:

executing a boot loading routine stored in non-volatile memory within said computer system, said boot loading routine including a decompression routine;

decompressing a driver routine and a compressed diagnostic routine stored in said non volatile memory into video random access memory (RAM), said driver routine providing an environment in lieu of an operating system of said computer system within which to execute said diagnostic routine; and executing said driver routine under control of said boot loading routine.

2. The method as recited in claim 1 further comprising the step of verifying an integrity of information in said compressed diagnostic routine with said boot loading routine prior to performing said step of decompressing.

3. The method as recited in claim 1 further comprising the step of testing a functioning of a video subsystem of said computer system to determine whether said video subsystem is capable of operating in conjunction with said diagnostic routine prior to performing said step of decompressing.

4. The method as recited in claim 1 further comprising the step of determining a presence of a video monitor of said computer system prior to performing said step of decompressing.

5. The method as recited in claim 1 further comprising the step of decompressing a subsequent diagnostic routine following execution of said decompressed diagnostic routine.

6. The method as recited in claim 1 wherein said computer system is a personal computer (PC).

7. The method as recited in claim 1 wherein said non volatile memory is electrically programmable read only memory (EEPROM).

8. A system for providing diagnostic routines for use in a computer, comprising:

a boot loading routine stored in non volatile memory within said computer and including a decompression routine; and a driver routine and a compressed diagnostic routine stored in said non volatile memory, said driver routine providing an environment in lieu of an operating system of said computer within which to execute said diagnostic routine, said decompression routine decompressing said diagnostic routine into video random access memory (RAM), said boot loading routine initiating execution of said driver routine.

9. The system as recited in claim 8 further comprising a microprocessor for executing said boot loading routine and said decompressed diagnostic routine.

10. The system as recited in claim 8 wherein said computer comprises a video subsystem having a monitor and said video RAM, said video subsystem allowing said computer to communicate with a user.

11. The system as recited in claim 8 wherein said non volatile memory contains a plurality of compressed diagnostic routines.

12. The system as recited in claim 8 wherein said boot loading routine includes a routine for verifying an integrity of information in said compressed diagnostic routine.

13. The system as recited in claim 8 wherein said boot loading routine includes a routine for testing a functioning of a video subsystem of said computer to determine whether said video subsystem is capable of communicating with a user.

14. The system as recited in claim 8 wherein said boot loading routine decompresses a subsequent selected diagnostic routine following execution of said decompressed diagnostic routine.

15. The system as recited in claim 8 wherein said computer is a personal computer (PC).

16. The system as recited in claim 8 wherein said non volatile memory is electrically erasable programmable read only memory (EEPROM).

17. In a personal computer (PC) having a microprocessor, video random access memory (RAM), electrically erasable programmable read only memory (EEPROM) and a bus coupling said microprocessor to said video RAM and said EEPROM, a method of performing diagnostic routines, comprising the steps of:

executing, with said microprocessor, a boot loading routine stored in said EEPROM, said boot loading routine containing a decompression routine; and decompressing, with said decompression routine, a driver routine and an initial portion of diagnostic routine code stored in said EEPROM in compressed form, said driver routine providing an elemental operating system to support performance of said initial portion, said initial portion loaded into said video RAM for execution by said microprocessor, said driver routine decompressing and loading a subsequent portion of diagnostic routine code into said video RAM following execution of said initial portion.

18. The personal computer as recited in claim 17 further comprising the step of verifying an integrity of information in said diagnostic routine code with said boot loading routine prior to performing said step of decompressing.

19. The personal computer as recited in claim 17 further comprising the step of testing a functioning of a video subsystem of said PC to determine whether said video subsystem is capable of operating in conjunction with said diagnostic routine code prior to performing said step of decompressing.

20. The personal computer as recited in claim 17 further comprising the step of determining a presence of a video monitor of said PC prior to performing said step of decompressing.

21. A computer memory subsystem in a computer system, comprising:
   flash read only memory (ROM) containing (1) a boot loading routine, said boot loading routine including a decompression routine, (2) a driver routine, said driver routine providing an environment in lieu of an operating system of said computer system within which to execute diagnostic routines and (3) a compressed diagnostic routine; and
   video random access memory (RAM) for storing said driver routine and a decompressed diagnostic routine, said decompression routine decompressing said compressed diagnostic routine to produce said decompressed diagnostic routine, said boot loading routine storing said decompressed diagnostic routine in said video RAM and causing execution of said driver routine.

22. The subsystem as recited in claim 21 wherein said computer system comprises a microprocessor for executing said boot loading routine and said decompressed diagnostic routine.

23. The subsystem as recited in claim 21 wherein said computer system comprises a video subsystem having a monitor and said video RAM, said video subsystem allowing said computer to communicate with a user.

24. The subsystem as recited in claim 21 wherein said flash ROM contains a plurality of compressed diagnostic routines.

25. The subsystem as recited in claim 21 wherein said boot loading routine includes a routine for verifying an integrity of information in said compressed diagnostic routine.

26. The subsystem as recited in claim 21 wherein said boot loading routine includes a routine for testing a functioning of a video subsystem of said computer system to determine whether said video subsystem is capable of communicating with a user.

27. The subsystem as recited in claim 21 wherein said boot loading routine decompresses a subsequent selected diagnostic routine following execution of said decompressed diagnostic routine.

28. The subsystem as recited in claim 21 wherein said computer system is a personal computer (PC).

29. A method of loading diagnostic programs in a personal computer (PC), comprising the steps of:
   verifying an integrity of information in compressed diagnostic routines stored in non volatile memory with a boot loading routine;
   testing a functioning of a video subsystem of said PC to determine whether said video subsystem is capable of operating in conjunction with said diagnostic programs;
   determining a presence of a video monitor of said PC;
   decompressing a driver routine and a selected one of said compressed diagnostic routines to thereby transform said selected one into a decompressed diagnostic routine;
   storing said decompressed diagnostic routine in video random access memory (RAM) within said video subsystem;
   executing said driver routine; and
   decompressing a subsequent selected diagnostic routine following execution of said decompressed diagnostic routine, said boot loading routine performing said testing, determining, decompressing and storing steps, said driver routine performing said executing step.

30. The method as recited in claim 29 wherein said non volatile memory is electrically erasable programmable read only memory (EEPROM).

31. The method as recited in claim 29 wherein said PC further comprises a keyboard allowing a user to interact with said diagnostic routine.

32. The method as recited in claim 29 wherein said method of loading diagnostic programs is initiated by pressing a reset button on said PC twice within a predetermined period of time.

33. A personal computer (PC), comprising:
   a microprocessor;
   a video subsystem having a monitor and video random access memory (RAM), said video subsystem allowing said PC to communicate with a user;
   non volatile memory, said non volatile memory containing a boot loading routine, a driver routine and a plurality of selectable compressed diagnostic routines, said boot loading routine containing:
   a routine for verifying an integrity of information in said plurality of compressed diagnostic routines;
   a routine for testing a functioning of said video subsystem to determine whether said video subsystem is capable of communicating with said user;
   a routine for decompressing a selected one of said compressed diagnostic routines to thereby transform said selected one into a decompressed diagnostic routine;
   a routine for storing said decompressed diagnostic routine in said video RAM within said video subsystem; and
   a driver routine for providing an elemental operating system to support performance of diagnostics on said PC and for executing said decompressed diagnostic routine, said decompressing routine decompressing a subsequent selected diagnostic routine following execution of said decompressed diagnostic routine.

34. The PC as recited in claim 33 wherein said non volatile memory is electrically erasable programmable read only memory (EEPROM).

35. The PC as recited in claim 33 wherein said PC further comprises a keyboard allowing a user to interact with said decompressed diagnostic routine.

36. The PC as recited in claim 33 wherein said boot loading routine is invoked by pressing a reset button on said PC twice within a predetermined period of time.

* * * * *